US 9,302,578 B2

(12) United States Patent
Suzuki et al.

(10) Patent No.: US 9,302,578 B2
(45) Date of Patent: Apr. 5, 2016

(54) IN-WHEEL MOTOR-DRIVEN DEVICE

(71) Applicants: Minoru Suzuki, Iwata (JP); Ken Yamamoto, Iwata (JP); Ryou Yukishima, Iwata (JP)

(72) Inventors: Minoru Suzuki, Iwata (JP); Ken Yamamoto, Iwata (JP); Ryou Yukishima, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/506,895

(22) Filed: Oct. 6, 2014

(65) Prior Publication Data
US 2015/0021974 A1 Jan. 22, 2015

Related U.S. Application Data

(62) Division of application No. 13/636,212, filed as application No. PCT/JP2011/057148 on Mar. 24, 2011, now abandoned.

(30) Foreign Application Priority Data

Mar. 25, 2010 (JP) .................. 2010-069244
May 14, 2010 (JP) .................. 2010-112400

(51) Int. Cl.
*B60K 7/00* (2006.01)
*B60K 17/04* (2006.01)
(Continued)

(52) U.S. Cl.
CPC .............. *B60K 7/0007* (2013.01); *B60K 1/00* (2013.01); *B60K 17/046* (2013.01); *H02K 7/116* (2013.01);
(Continued)

(58) Field of Classification Search
CPC ............... B60K 7/0007; B60K 17/046; B60K 2007/0038; B60K 2007/0092; B60K 1/00; H02K 5/225
USPC .......................... 180/65.51; 301/6.5
See application file for complete search history.

(56) References Cited

U.S. PATENT DOCUMENTS 5,087,229 A * 2/1992 Hewko et al. ............. 475/149
7,002,271 B2 2/2006 Reed et al.
(Continued)

FOREIGN PATENT DOCUMENTS

DE 10 2007 042 456 3/2009
EP 0 697 759 2/1996
(Continued)

OTHER PUBLICATIONS

Office Action issued Mar. 18, 2014 in corresponding Japanese Application No. 2010-112400, with English translation.
(Continued)

*Primary Examiner* — John Walters
*Assistant Examiner* — Brian Swenson
(74) *Attorney, Agent, or Firm* — Wenderoth, Lind & Ponack, L.L.P.

(57) ABSTRACT

An in-wheel motor driving device in which a motor section A and a wheel hub bearing section C are connected coaxially in series via a speed reducer section B, whereby an axial dimension of the in-wheel motor driving device is reduced to provide a large inside space of a vehicle as well as an increase in freedom of routing a power supply wires. A terminal box for the power supply wires which supply power to the motor section A is disposed on the outer circumferential side surface of the housing which holds the motor section A. The power supply wires are routed out of the terminal box to an inboard side and are anchored by a power supply wire holder which extends perpendicularly to an axial centerline of the housing.

7 Claims, 13 Drawing Sheets

(51) Int. Cl.
*H02K 7/116* (2006.01)
*B60K 1/00* (2006.01)
*F16H 1/32* (2006.01)
*H02K 5/18* (2006.01)
*H02K 7/14* (2006.01)

(52) U.S. Cl.
CPC . *B60K 2007/0038* (2013.01); *B60K 2007/0092* (2013.01); *F16H 2001/325* (2013.01); *H02K 5/18* (2013.01); *H02K 7/14* (2013.01); *Y02T 10/641* (2013.01)

(56) References Cited

U.S. PATENT DOCUMENTS

| | | | |
|---|---|---|---|
| 7,172,042 B2 | 2/2007 | Yamaguchi et al. | |
| 7,195,087 B2 | 3/2007 | Hatsuda et al. | |
| 7,458,433 B2 | 12/2008 | Harrup et al. | |
| 7,653,987 B2* | 2/2010 | Tokuda et al. | 29/760 |
| 8,020,653 B2* | 9/2011 | Mizutani et al. | 180/65.51 |
| 8,358,041 B2* | 1/2013 | Isogai et al. | 310/71 |
| 2002/0043883 A1 | 4/2002 | Shimizu | |
| 2002/0050752 A1 | 5/2002 | Katsuzawa et al. | |
| 2004/0080223 A1 | 4/2004 | Shimizu | |
| 2005/0285457 A1 | 12/2005 | Tsutsui et al. | |
| 2006/0219449 A1* | 10/2006 | Mizutani et al. | 180/65.5 |
| 2009/0038865 A1 | 2/2009 | Moriguchi et al. | |
| 2010/0084205 A1 | 4/2010 | Tarchinski et al. | |
| 2011/0118070 A1 | 5/2011 | Purretat et al. | |
| 2014/0354044 A1* | 12/2014 | Goto et al. | 307/9.1 |

FOREIGN PATENT DOCUMENTS

| | | |
|---|---|---|
| EP | 1 362 736 | 11/2003 |
| JP | 62-7763 | 1/1987 |
| JP | 2003-264949 | 9/2003 |
| JP | 2004-120911 | 4/2004 |
| JP | 2004-153895 | 5/2004 |
| JP | 2005-271909 | 10/2005 |
| JP | 2006-240429 | 9/2006 |
| JP | 2006-304543 | 11/2006 |
| JP | 2006-340585 | 12/2006 |
| JP | 2008-1241 | 1/2008 |
| JP | 2008-308033 | 12/2008 |
| JP | 2009-67318 | 4/2009 |
| JP | 2009-96429 | 5/2009 |
| JP | 2009-118602 | 5/2009 |
| JP | 2009-262616 | 11/2009 |
| WO | 2007/043514 | 4/2007 |
| WO | 2010/007127 | 1/2010 |

OTHER PUBLICATIONS

Supplementary European Search Report issued Oct. 21, 2013 in corresponding European Application No. EP 11 75 9501.
International Search Report issued Jun. 28, 2011 in International (PCT) Application No. PCT/JP2011/057148.
International Preliminary Report on Patentability issued Oct. 11, 2012 in International Application No. PCT/JP2011/057148.
Office Action issued Mar. 17, 2015 in corresponding Japanese Application No. 2014-085409, with English translation thereof.
Notification of Reason(s) for Refusal issued Dec. 1, 2015 in Japanese Application No. 2014-085409, with English translation.

* cited by examiner

IN-WHEEL MOTOR-DRIVEN DEVICE

TECHNICAL FIELD

The present invention relates to an in-wheel motor driving device connecting an electric motor's output shaft with a wheel hub coaxially via a speed reducer.

BACKGROUND ART

A conventional in-wheel motor driving device 101 is disclosed in JP-A 2009-219271 Gazette (Patent Literature 1) for example.

As shown in FIG. 16, the in-wheel motor driving device 101 includes a housing 102 which is attached to a vehicle body; a motor section 103 which is placed therein and generates a driving force; a wheel hub bearing section 104 which is connected to a wheel; and a speed reducer section 105 which reduces rotation of the motor section 103 and transmits the rotation to the wheel hub bearing section 104, all connected in series.

In the in-wheel motor driving device 101 of the above-described construction, a low-torque high-rotation motor is utilized for the motor section 103 in view of reducing the size of the device. On the other hand, the wheel hub bearing section 104 requires a large torque in order to drive the wheel. For these reasons, a cycloid reduction gear system is often utilized for the speed reducer section 105 due to its compactness and high speed-reduction ratio.

A speed reducer section 105 utilizing a cycloid reduction gear system includes a motor-side rotation member 106 which has eccentric sections 106a, 106b; cycloid discs 107a, 107b which are disposed in the eccentric sections 106a, 106b; roller bearings 106c which rotatably support the cycloid discs 107a, 107b with respect to the motor-side rotation member 106; a plurality of outer circumferential engagers 108 which make engagement with outer circumferential surfaces of the cycloid discs 107a, 107b to generate rotational movement of the cycloid discs 107a, 107b; and a plurality of inner pins 109 which transmit the rotational movement of the cycloid discs 107a, 107b to the wheel-side rotation member 110.

CITATION LIST

Patent Literature

Patent Literature 1: JP-A 2009-219271 Gazette

SUMMARY OF INVENTION

Technical Problem

In order to drive the above-described in-wheel motor driving device 101, power supply wires 111 are necessary for applying a voltage of a predetermined frequency to the motor section 103.

Conventionally, the power supply wires 111 are housed in a terminal box 112, which is disposed on a laterally inside (inboard) end surface of a housing 102 of the motor section 103, i.e., on one of two axially oriented wall surfaces of the housing 102 that supports the motor section 103. This wall surface is on the farther side from a motor-side rotation member 106, and the power supply wires 111 are routed out of the box in the for-aft direction of the vehicle.

For this reason, there has been an inherent problem that a large stress is applied to the power supply wire 111 when connection is made to an inverter which is disposed above or below the driving unit.

Also, if the terminal box 112, which houses the power supply wire 111 that supply electric power to the motor section 103, is disposed as described above, i.e., on the laterally inboard side of the housing 102 of the motor section 103, the driving unit has to be axially longer as shown in FIG. 8B, by the size of the terminal box 112, posing a problem that the space for housing the suspension system must be reduced.

Particularly, in the in-wheel motor driving device 101 in which the motor-side rotation member 106 and a wheel hub bearing section 104 are connected coaxially in series via the speed reducer section 105, it is necessary to make the axial dimension as small as possible if the in-vehicle space is to be maximized.

Further, in addition to the power supply wires 111 which supply an electrical current to the motor coils, the vehicle requires a cable, in order to drive the motor section 103, for a rotation angle sensor which obtains relative-angle information between the motor's stator and the rotor. Generally, the rotation angle sensor works by a weak electric current. Therefore, placing the power supply wires, through which a large amount of electric current pass, near the rotation angle sensor cable will cause a problem of electromagnetic noise inclusion in the sensor signal, which could lead to malfunction of the motor rotation.

It is therefore a first object of the present invention to provide a new arrangement for disposing the terminal box which houses the power supply wires for reduced axial dimension of the in-wheel motor driving device in which the motor-side rotation member and the wheel hub bearing section are connected coaxially in series via the speed reducer section, thereby providing a large inside space of the vehicle as well as increasing freedom of routing the power supply wires.

Further, it is a second object of the present invention to give new considerations to the layout of the power supply wires through which a large electric current pass and the cable for the rotation angle sensor so as to reduce chances for the sensor signal to be contaminated by electromagnetic noises, thereby reducing chances for malfunction of the motor rotation.

Solution to Problem

In order to solve the first object, the present invention provides an in-wheel motor driving device including: a motor section which rotates a motor-side rotation member; a speed reducer section which reduces and transmits rotation of the motor-side rotation member to a wheel-side rotation member; and a wheel hub connected and fixed to the wheel-side rotation member, where the above three elements are disposed in series from an inboard side to an outboard side of a vehicle. In this arrangement, a terminal box for a power supply wire which supplies power to the motor section is disposed on an outer circumferential side surface of a housing which supports the motor section.

With the above arrangement, it is now possible to route a wire from the stator of the motor section perpendicularly to an axial centerline of the housing which supports the motor section. This makes it possible to dispose a power supply wire holder, which was extended perpendicularly to a laterally inboard end surface of the vehicle in conventional arrangements, perpendicularly to the axial centerline of the housing. Thus, the axial length, i.e., the length in the inboard direction, of the overall driving unit is reduced in the present invention.

Also, the power supply wire out of the terminal box which is now disposed on the outer circumferential surface of the housing of the motor section is preferably anchored to a power supply wire holder that is provided on a side surface of an outer circumferential surface of the motor section and is extended perpendicularly to an axial centerline of the housing.

The power supply wire includes a copper wire and an elastic member which covers the copper wire. Therefore, the power supply wire holder preferably has a holder portion which is shaped to hold the elastic member of the power supply wire in a swaging manner.

In order to achieve the second object, a cable outlet for a rotation angle sensor is provided on an outer circumferential surface or an inner end surface of the housing of the motor section, at a position about 180 degrees away around the rotation axis of the motor section from the terminal box which houses the power supply wire and is disposed on the outer circumferential side surface of the housing of the motor section. This maximizes a relative distance between the power supply wire and the rotation angle sensor cable, making it possible to reduce noises in the sensor signals.

The power supply wire is inserted into the terminal box via a sealing member.

Next, the first object in the present invention can also be achieved by another arrangement. Specifically, a terminal box for the power supply wire which supplies power to the motor section is disposed on an outboard-side end surface of the housing which supports the motor section and the holder for anchoring the power supply wire which is routed out of the terminal box to an inboard side is provided on the housing which supports the motor section.

In this arrangement, the wire from the stator of the motor section is routed in an outboard direction of the housing which supports the motor section.

Still another solution is that the terminal box for the power supply wire which supplies power to the motor section is disposed on an outboard-side outer circumferential surface of a housing which supports the motor section, and the holder for anchoring the power supply wire which is routed out of the terminal box onto an inboard side is provided on the housing which supports the motor section.

In this case, the wire from the stator of the motor section is routed in a radial direction of the housing which supports the motor section.

The terminal box includes a box main body formed integrally with the housing which supports the motor section; and a lid member for closing an opening of the box main body. The lid member seals the box main body with a sealing member.

Advantageous Effects of Invention

As understood from the above, according to the in-wheel motor driving device offered by the present invention, the terminal box for the power supply wire which supplies power to the motor section is disposed on an outer circumferential side surface of the housing which supports the motor section. Therefore, the axial dimension is reduced by the size of the terminal box and the vehicle's inside space is increased accordingly.

The arrangement also makes it possible to dispose the power supply wire holder, which was extended perpendicularly to a laterally inboard end surface of the vehicle in conventional arrangements, perpendicularly to the axial centerline of the housing. Thus, an axial length of the overall driving unit is reduced.

Also, the arrangement prevents the power supply wire from being subjected to an excessively large stress even in a case where an inverter is disposed in the up-down direction with respect to the driving unit, e.g. a case where the inverter is disposed under the floor, in a luggage space, or in an engine compartment.

Further, the power supply wire, which extends from the terminal box to the inverter, is anchored by the power supply wire holder which is provided on the housing of the same motor section. This prevents the power supply wire from being damaged by impact or vibration, providing an in-wheel motor driving device which is superior in safety and reliability.

Also, the terminal box for the power supply wire which supplies power to the motor section is disposed on an outboard-side end face, or on an outboard-side outer circumferential surface, of the housing which supports the motor section. This reduces the axial dimension by the size of the terminal box, making it possible to increase the vehicle's inside space accordingly.

DESCRIPTION OF EMBODIMENTS

Hereinafter, embodiments of the present invention will be described based on the attached drawings.

Figure 8A:
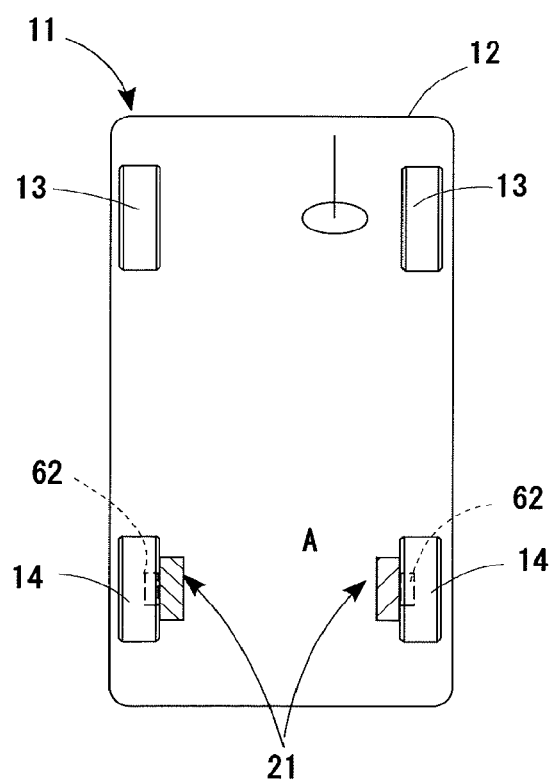
FIG. 8A is a simplified plan view of an electric vehicle which includes in-wheel motor driving devices in FIG. 1.
Figure 9:
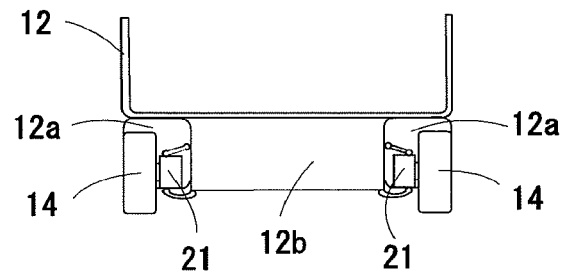
FIG. 9 is a rear view of the electric vehicle in FIG. 8A.

As shown in FIG. 8A, an electric vehicle 11 equipped with in-wheel motor driving devices according to an embodiment of the present invention includes a chassis 12, front wheels 13 as steering wheels, rear wheels 14 as driving wheels, and in-wheel motor driving devices 21 which transmit driving forces to the left and the right rear wheels 14 respectively. As shown in FIG. 9, the rear wheels 14 are housed inside wheel housings 12a of the chassis 12 and are fixed to a lower portion of the chassis 12 via suspension systems 12b.

Figure 10:
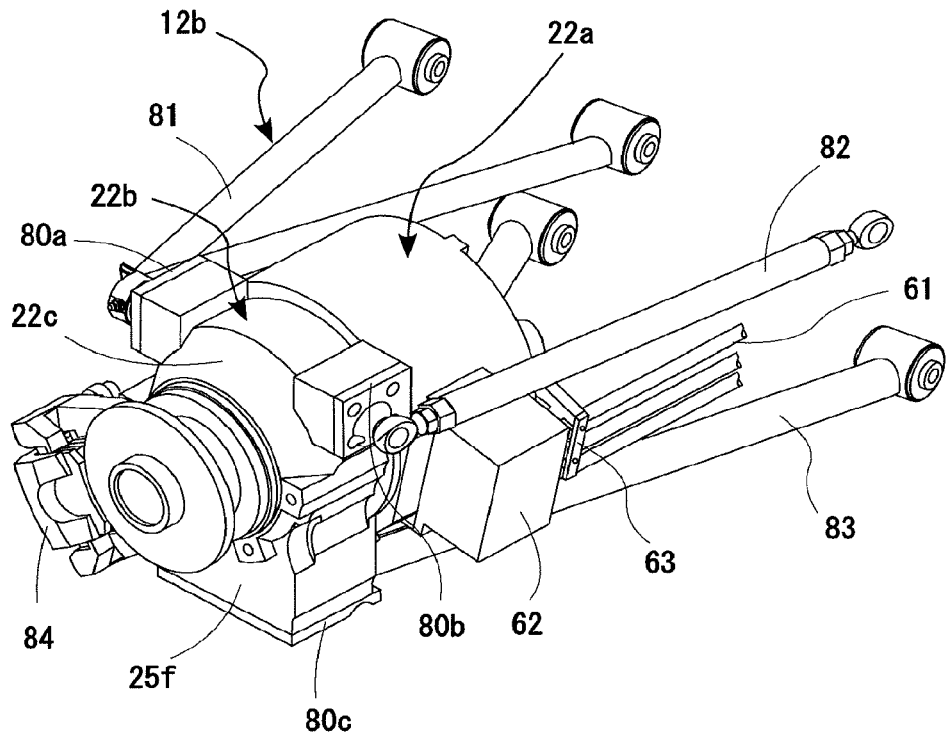
FIG. 10 is a perspective view of an in-wheel motor driving device equipped with a suspension system.

As shown in FIG. 10, the suspension system 12b is attached to a housing 22b of the speed reducer section B via suspension mounting brackets.

The housing 22b of the speed reducer section B includes a generally cylindrical section 22c which houses a speed reducing mechanism, and a lubrication oil reservoir 25f which stores lubrication oil. The suspension mounting brackets are fixed to two upper side surfaces of the generally cylindrical section 22c and to a lower end surface of the lubrication oil reservoir 25f.

The suspension system 12b has an upper arm 81, which is attached to one of the upper side surface of the generally cylindrical section 22c of the housing 22b in the speed reducer section B via an upper arm bracket 80a.

The suspension system 12b has a tow control rod 82, which is attached to the other of the upper side surfaces of the generally cylindrical section 22c of the housing 22b in the speed reducer section B via a tow control rod bracket 80b.

Also, the suspension system 12b has a lower arm 83, which is attached to the lower end surface of the lubrication oil reservoir 25f in the speed reducer section B via a lower arm bracket 80c.

A shock absorber (not illustrated) which reduces vibration from the road surface is disposed in a space between the lower arm 83 and the upper arm 81. The shock absorber has a lower end, which is fixed to the lower arm 83, and an upper end, which is fixed to the chassis 12.

Also, as shown in FIG. 10, brake caliper 84 is fixed to the housing 22b of the speed reducer section B.

A brake disc 15 is fixed to the wheel 14 via the wheel hub bearing section C for integral rotation therewith.

Figure 11:
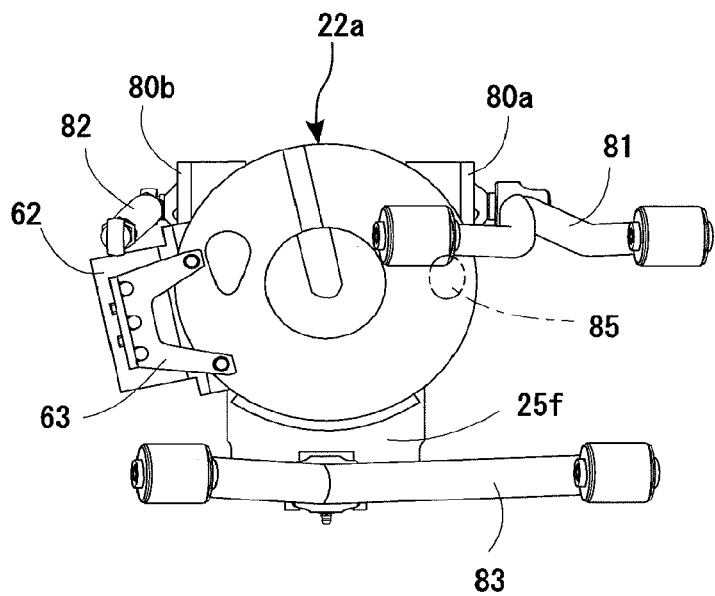
FIG. 11 is a rear view of the in-wheel motor driving device in FIG. 10 viewed from an inboard side.

As shown in FIG. 11 and FIG. 10, in the electric vehicle 11 which includes the in-wheel motor driving devices according to the first embodiment of the present invention, a terminal box 62, which houses power supply wires 61 that supply power to the motor section A, is disposed on an outer circumferential side surface of a housing 22a which supports the motor section A. Therefore, the axial dimension is reduced by the size of the terminal box 62 and the vehicle's inside space is increased accordingly.

From the terminal box 62, the power supply wires 61 are extended to the inboard side, and are anchored as shown in FIG. 11, to the power supply wire holder 63 which is bolted to an inboard side end surface of the housing 22a that supports the motor section A. The power supply wire holder 63 extends perpendicularly to an axial centerline of the housing 22a.

The motor section A has a stator 23, from which the power supply wires 61 are pulled perpendicularly to the outer circumferential side surface of the housing 22a, and housed inside the terminal box 62. Further, the power supply wires 61 are pulled out of the terminal box 62 onto the inboard side, anchored to the power supply wire holder 63, and then connected to a power source via an inverter so that a voltage of a predetermined frequency is applied to the stator 23 to rotate the motor section A.

The power supply wire 61 includes a copper wire and an elastic member which covers the copper wire. The power supply wire holder 63 has a holder portion which is shaped to hold the elastic member of the power supply wires in a swaging manner.

From the terminal box 62, the power supply wires 61 are routed out of a through-hole. The through-hole is fitted with a sealing member provided by an O ring for preventing lubrication oil from leaking out of the terminal box 62.

A cable outlet 85 for rotation angle sensor is located at a position which maximizes a relative distance between the power supply wires and the rotation angle sensor cable.

As shown in FIG. 11, the terminal box 62 which houses the power supply wires 61 is disposed on the outer circumferential side surface of the housing 22a in the motor section A. Therefore, the rotation angle sensor cable outlet 85 is provided on an inner end surface of the motor section A, at a position about 180 degrees away around the rotation axis of the motor section A. The relative distance between the power supply wires 61 and the rotation angle sensor cable can be maximized in this way, whereby noises in the sensor signal can be reduced.

In the embodiment shown in FIG. 11, the cable outlet 85 for the rotation angle sensor is located on the inner end surface of the housing 22a of the motor section A. However, the location may be on the outer circumferential side surface of the housing 22a of the motor section A as far as it is away from the terminal box 62 by about 180 degrees.

In the electric vehicle 11, each of the in-wheel motor driving devices 21 is housed individually inside the corresponding wheel housing 12a so as to drive one of the left and the right rear wheels 14. Therefore, there is no need for providing a motor, a drive shaft, a deferential gear mechanism, etc. on the chassis 12. This provides an advantage that a large space can be provided for the driver and passengers, and rotation of the left and the right drive wheels can be controlled independently from each other.

It is necessary, however, to reduce unsprung weight in order for the electric vehicle 11 to have improved driving stability. Also, in order to provide more driver/passenger space, there is a requirement for size reduction in the in-wheel motor driving devices 21 in its axial direction. This requirement is met by utilizing the in-wheel motor driving device 21 as shown in FIG. 1 according to an embodiment of the present invention.

Figure 1:
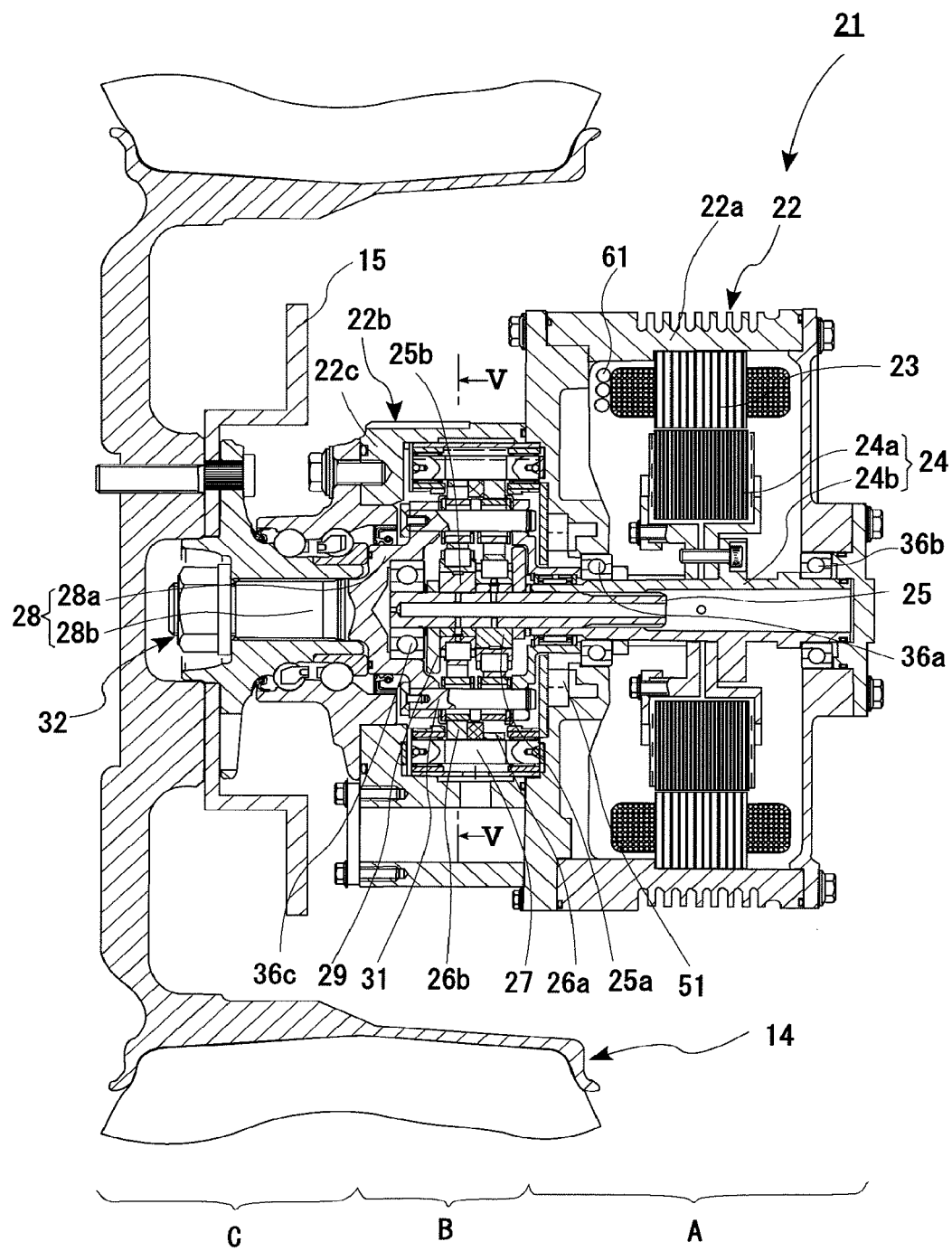
FIG. 1 is a simplified sectional view of an in-wheel motor driving device according to a first embodiment of the present invention.

First, as shown in FIG. 1, the in-wheel motor driving device 21 includes a motor section A which generates a driving force; a speed reducer section B which reduces rotating speed of the motor section A and outputs the rotating force; and a wheel hub bearing section C which transmits the output from the speed reducer section B to the wheel 14. The motor section A and the speed reducer section B are housed in the housing 22 and the device is installed inside the wheel housing 12a of the electric vehicle 11 as shown in FIG. 9.

Figure 2:
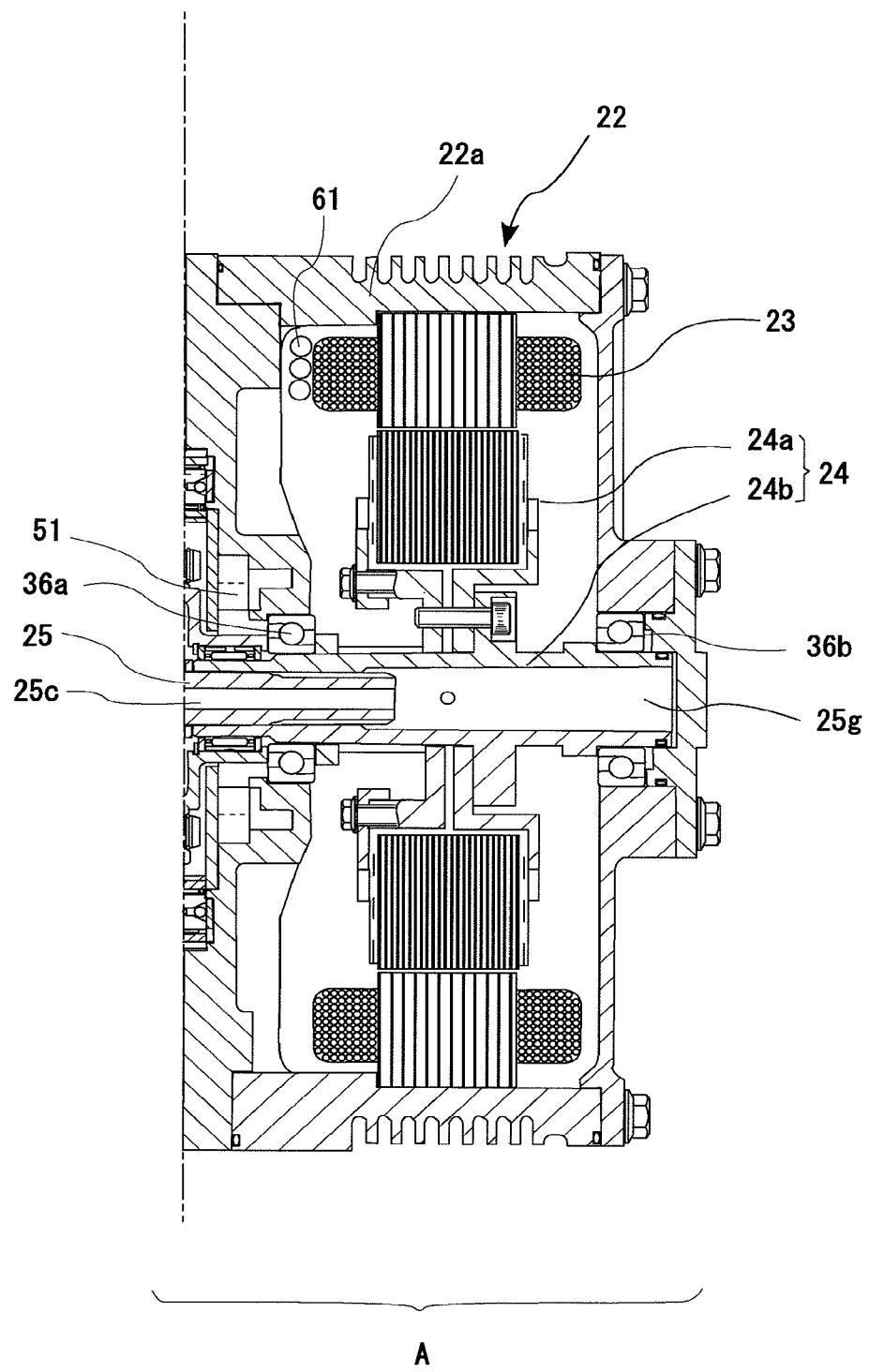
FIG. 2 is an enlarged view of a motor section in FIG. 1.

As shown in FIG. 2, the motor section A is provided by a radial-gap motor which includes a stator 23 fixed to the housing 22a; a rotor 24 disposed inside the stator 23 to face thereto with a radial gap in between; and a motor-side rotation member 25 disposed inside the rotor 24, being fixed thereto for integral rotation with the rotor 24. The rotor 24 includes a flange-shaped rotor section 24a and a cylindrical hollow section 24b, and is supported by roller bearings 36a, 36b rotatably with respect to the housing 22.

The motor-side rotation member 25, which transmits the driving force from the motor section A to the speed reducer section B, is disposed across the motor section A and the speed reducer section B, and includes eccentric sections 25a, 25b inside the speed reducer section B. The motor-side rotation member 25 has one end fitted into the rotor 24, and is supported by a roller bearing 36c inside the speed reducer section B. The two eccentric sections 25a, 25b are disposed at a 180-degree phase difference so that their centrifugal forces due to their eccentric movement are cancelled each other.

Figure 3:
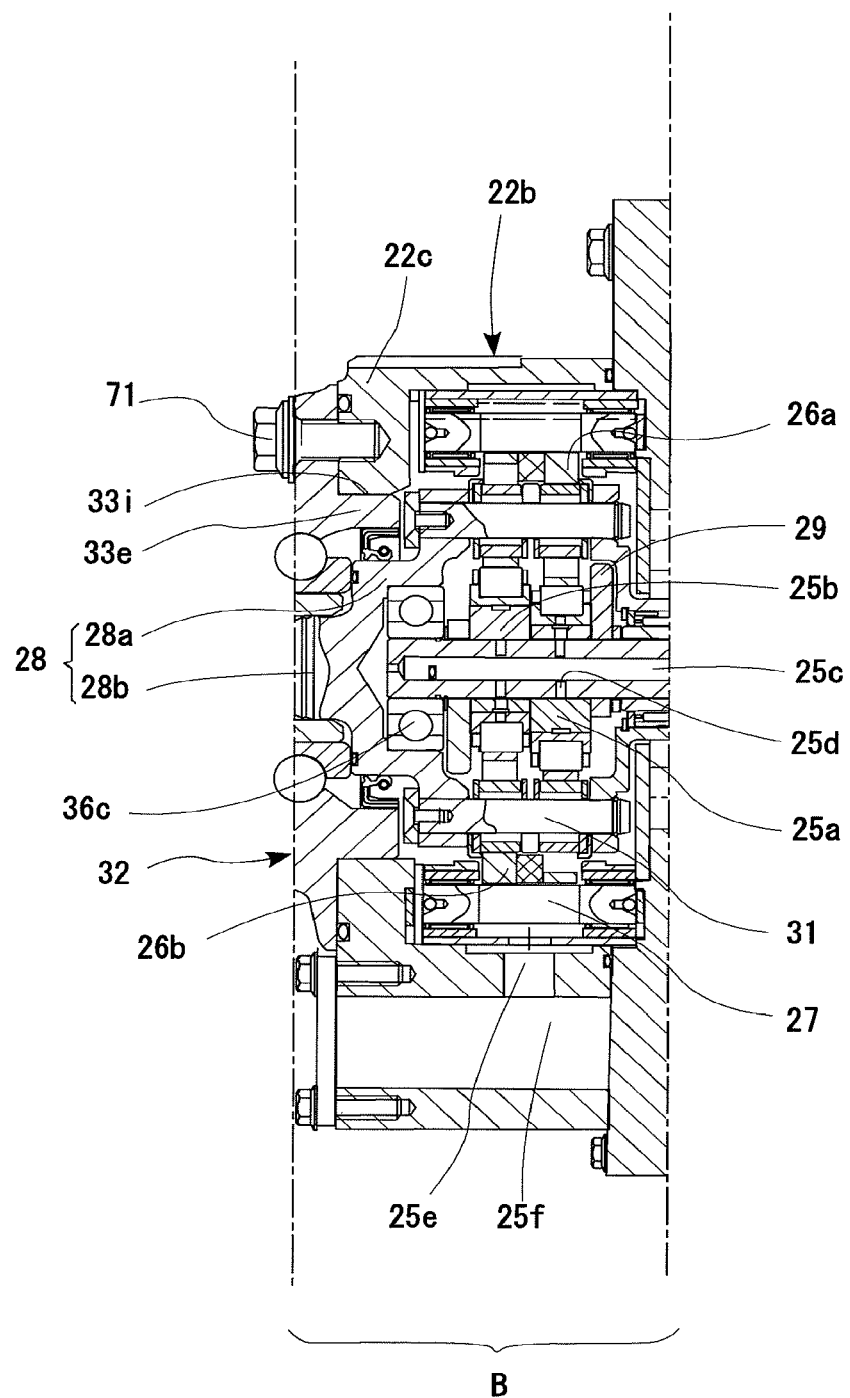
FIG. 3 is an enlarged view of a speed reducer section in FIG. 1.

As shown in FIG. 3, the speed reducer section B includes cycloid discs 26a, 26b which serve as revolving members and are rotatably held by the eccentric sections 25a, 25b; a plurality of outer pins 27 which are held at fixed locations on the housing 22b and serving as outer circumferential engager for engagement with the outer circumferential portion of the cycloid discs 26a, 26b; a motion conversion mechanism which transmits rotational movement of the cycloid discs 26a, 26b to a wheel-side rotation member 28; and counterweights 29 disposed adjacently to the eccentric sections 25a, 25b. The speed reducer section B also includes a speed reducer section lubrication mechanism which supplies lubrication oil to the speed reducer section B.

The wheel-side rotation member 28 includes a flange section 28a and a shaft section 28b. The flange section 28a has its end surface formed with holes at an equidistant interval on a circle centered on a rotational center of the wheel-side rotation member 28, for fixing the inner pins 31. The shaft section 28b is fitted into and fixed to a wheel hub 32, and transmits the output from the speed reducer section B to the wheel 14. The flange section 28a of the wheel-side rotation member 28 and the motor-side rotation member 25 are rotatably supported by the roller bearing 36c.

Figure 5:
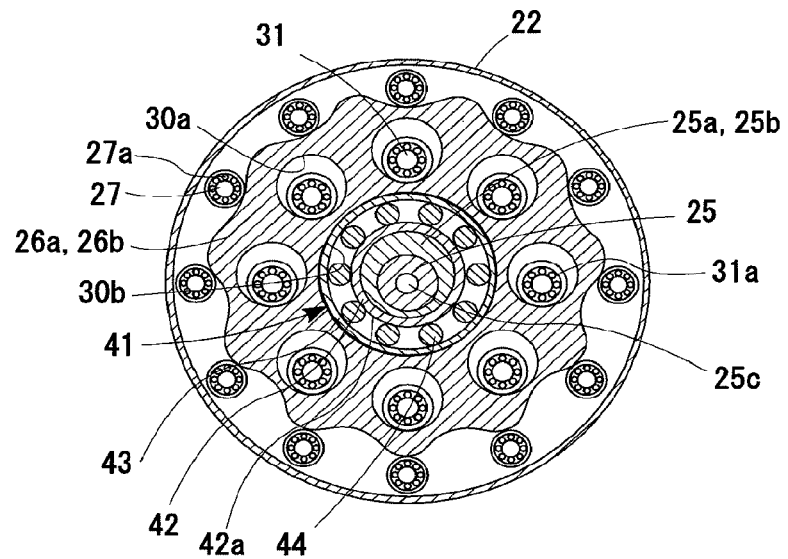
FIG. 5 is a sectional view taken in line V-V in FIG. 1.

As shown in FIG. 5, the cycloid discs 26a, 26b have a plurality of waveforms composed of trochoid curves such as epitrochoid curves, on their outer circumferences, and a plurality of through-holes 30a penetrating from one end surface to the other end surface. The through-holes 30a are made equidistantly on a circle centering on the rotational center of the cycloid discs 26a, 26b, and accommodate inner pins 31 which will be described later. Also, a through-hole 30b penetrates the center of the cycloid discs 26a, 26b, and fits around the eccentric sections 25a, 25b.

The cycloid discs 26a, 26b are supported by a roller bearing 41 rotatably with respect to the eccentric sections 25a, 25b. As shown in FIG. 5, the roller bearing 41 is provided by a cylindrical roller bearing which includes an inner ring member 42 fitted around outer diameter surfaces of the eccentric sections 25a, 25b and having an inner track surface 42a on its outer diameter surface; an outer track surface 43 formed directly on an inner diameter surface of the through-hole 30b of the cycloid disc 26a; a plurality of cylindrical rollers 44 disposed between the inner track surface 42a and the outer track surface 43; and a retainer (not illustrated) which keeps the distance between the cylindrical rollers 44.

The outer pins 27 are disposed equidistantly on a circular track which centers on the rotational center of the motor-side rotation member 25. As the cycloid discs 26a, 26b make their revolutions, the wavy curves and the outer pins 27 engage with each other and generate rotational movement of the cycloid discs 26a, 26b. In order to reduce frictional resistance with the cycloid discs 26a, 26b, needle bearings 27a are provided at places of contact with the outer circumferential surfaces of the cycloid discs 26a, 26b.

The counterweights 29 are disc-like, have a through-hole at a place away from its center for fitting around the motor-side rotation member 25, and are disposed adjacently to the eccentric sections 25a, 25b respectively, at a 180-degree phase difference therefrom in order to cancel unbalanced inertia couple caused by the rotation of the cycloid discs 26a, 26b.

Figure 6:
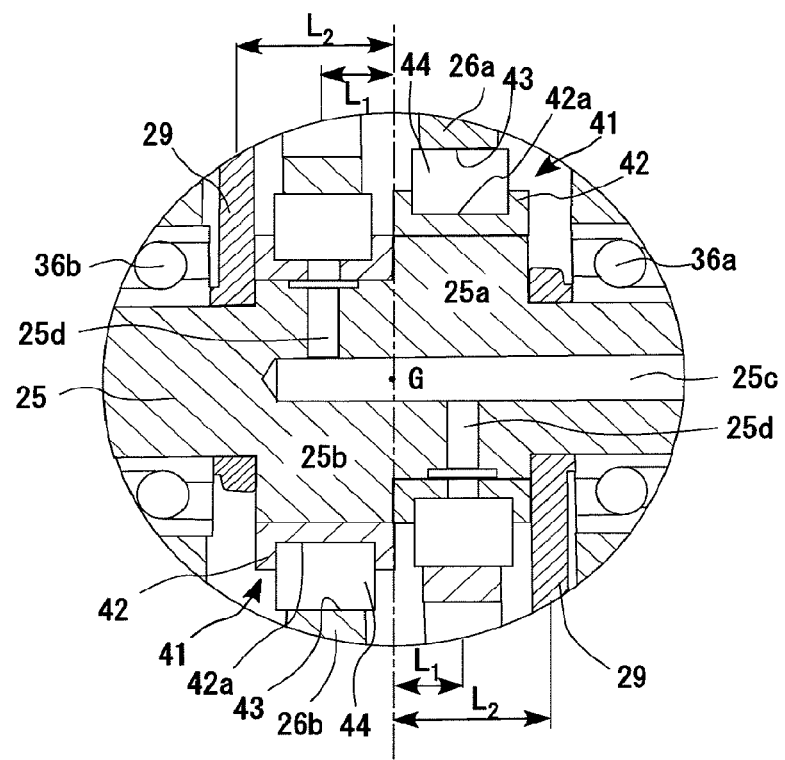
FIG. 6 is an enlarged view showing an area surrounding eccentric section in FIG. 1.

In the above-described arrangement, with reference to FIG. 6 which shows a center G of the two cycloid discs 26a, 26b, there is a relationship expressed by the following equation: $L_1 \times m1 \times \epsilon 1 = L_2 \times m2 \times \epsilon 2$, where, $L_1$ represents a distance from the center G to the center of the cycloid disc 26a in the right side with respect of the center G in the FIG. 6; m1 represents a sum of masses of the cycloid disc 26a, the roller bearing 41 and the eccentric section 25a; $\epsilon 1$ represents an amount of eccentricity of the center of gravity of cycloid discs 26a from the axis of rotation; $L_2$ represent the distance from the center G to the counterweight 29; m2 represents the mass of the counterweight 29; and $\epsilon 2$ represents an amount of eccentricity of the center of gravity of the counterweight 29 from the axis of rotation. The same relationship exists between the cycloid discs 26b and the counterweight 29 on the left side with respect to the center G in FIG. 6.

The motion conversion mechanism is constituted by a plurality of inner pins 31 held by the wheel-side rotation member 28 and the through-holes 30a formed in the cycloid discs 26a, 26b. The inner pins 31 is disposed equidistantly on a circular track centering on the rotational center of the wheel-side rotation member 28, and has one of its axial ends fixed to the wheel-side rotation member 28. Also, in order to reduce frictional resistance with the cycloid discs 26a, 26b, needle bearings 31a are provided at places of contact with the inner wall surfaces of the through-holes 30a of the cycloid discs 26a, 26b.

On the other hand, the through-holes 30a are formed at locations corresponding to a plurality of the respective inner pins 31. Each of the through-holes 30a has an inner diameter which is larger, by a predetermined difference, than an outer diameter (a "maximum outer diameter including the needle bearing 31a", hereinafter the same will apply) of the inner pins 31.

The speed reducer section lubrication mechanism supplies lubrication oil to the speed reducer section B, and includes a lubrication oil path 25c, a lubrication oil inlets 25d, a lubrication oil exit 25e, a lubrication oil reservoir 25f, a rotary pump 51 and a circulation oil path 25g.

The lubrication oil path 25c extends axially inside of the motor-side rotation member 25. The lubrication oil inlets 25d extend from the lubrication oil path 25c toward an outer diameter surface of the motor-side rotation member 25. In the present embodiment, the lubrication oil inlet 25d is provided in each of the eccentric sections 25a, 25b.

Also, the lubrication oil exit 25e from which the lubrication oil inside the speed reducer section B is discharged, is provided at least at one location in a bottom portion of the housing 22b which supports the speed reducer section B. The lubrication oil reservoir 25f is provided in the bottom portion of the housing 22b which supports the speed reducer section B.

The lubrication oil in the lubrication oil reservoir 25f is sucked by the rotary pump 51, and circulated forcibly via the circulation oil path 25g and to the lubrication oil path 25c.

Figure 7:
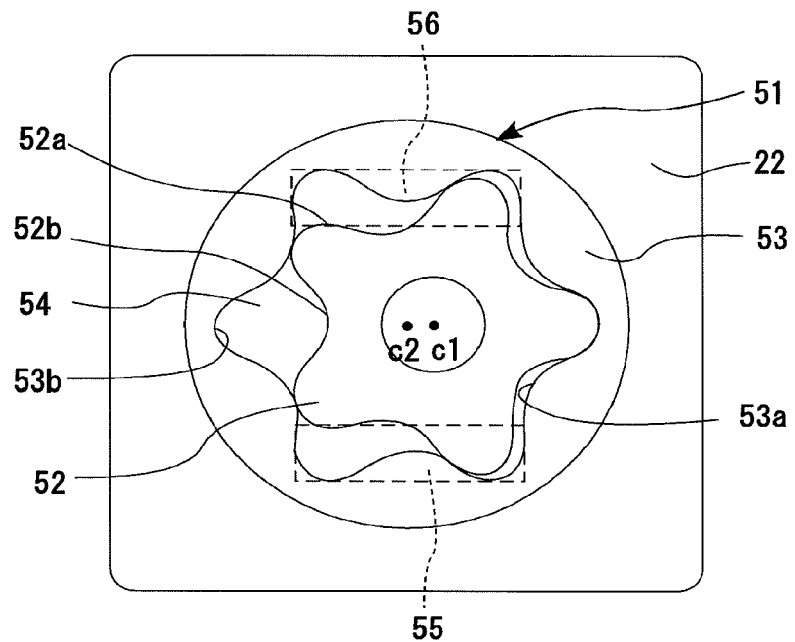
FIG. 7 is a view when a rotary pump in FIG. 1 is viewed from an axial direction.

As shown in FIG. 7, the rotary pump 51 is a cycloid pump which includes an inner rotor 52 rotated by using rotation of the wheel-side rotation member 28; an outer rotor 53 rotated in association with the rotation of the inner rotor 52; pump chambers 54; a suction port 55; and a discharge port 56 which communicates with the circulation oil path 25g.

The inner rotor 52 has an outer diameter surface formed with a cycloid teeth pattern. Specifically, tooth tip portions 52a are composed of epicycloid curves while tooth groove portions 52b are composed of hypocycloid curves. The inner rotor 52 rotates integrally with the inner pins 31 (wheel-side rotation member 28).

The outer rotor 53 has an inner diameter surface formed with a cycloid teeth pattern. Specifically, tooth tip portions 53a are composed of hypocycloid curves while tooth groove portions 53b are composed of epicycloid curves. The outer rotor 53 is supported rotatably by the housing 22.

The inner rotor 52 rotates on a rotation center c1. On the other hand, the outer rotor 53 rotates on a rotation center c2 which is different from the rotation center c1 of the inner rotor. It should be noted here that when the inner rotor 52 has as many as n teeth, then the outer rotor 53 has (n+1) teeth. In the present embodiment, n=5.

A plurality of pump chambers 54 are provided in a space between the inner rotor 52 and the outer rotor 53. With the above arrangement, as the inner rotor 52 rotates by using the rotation of the wheel-side rotation member 28, the outer rotor 53 is driven to rotate. Since the inner rotor 52 and the outer rotor 53 rotate on the different rotation centers $c_1$, $c_2$ in this process, the volume of each pump chamber 53 changes constantly. Thus, the lubrication oil from the suction ports 55 is pumped out of the discharge port 56 to the circulation oil path 25g.

Figure 4:
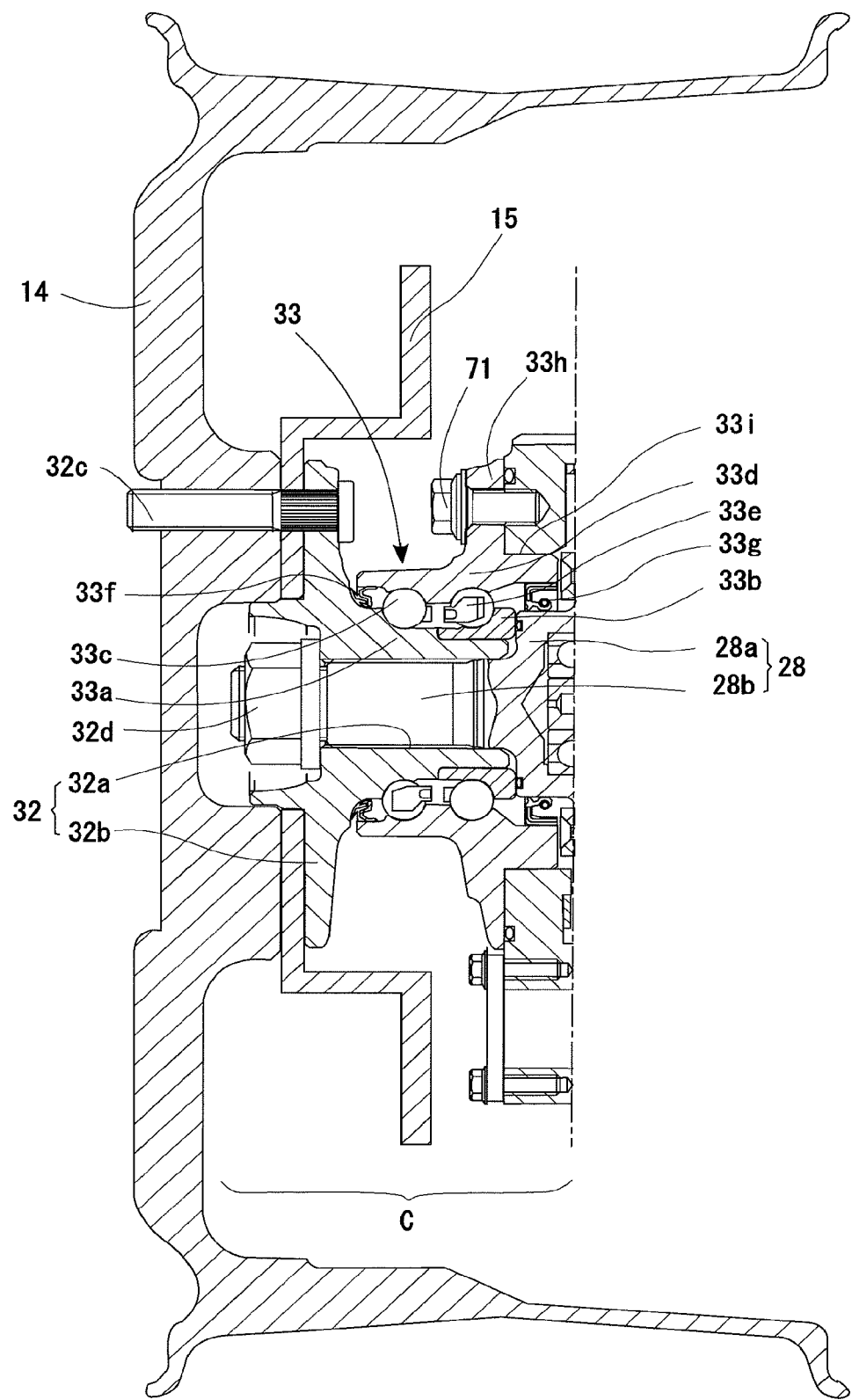
FIG. 4 is an enlarged view of a wheel hub bearing section in FIG. 1.

As shown in FIG. 4, the wheel hub bearing section C includes a wheel hub 32 which is connected and fixed to the wheel-side rotation member 28, and a wheel hub bearing 33 which supports the wheel hub 32 rotatably with respect to the housing 22b of the speed reducer section B. The wheel hub 32 has a cylindrical hollow section 32a and a flange section 32b. The flange section 32b is fixed and connected with a wheel 14 by bolts 32c. The shaft section 28b of the wheel-side rotation member 28 has its outer diameter surface formed with a spline and a male thread. The hollow section 32a of the wheel hub 32 has its inner diameter surface formed with a spline hole. The wheel-side rotation member 28 is threaded into the inner diameter surface of the wheel hub 32, and a nut 32d is threaded to fasten the two members with each other. A brake disc 15 is provided between the wheel 14 and the flange section 32b of the wheel hub 32.

The wheel hub bearing 33 is provided by a double-row angular contact ball bearing which includes an inside member 33a constituted by an outer-side track surface which is integrally formed on an outer diameter surface of the hollow section 32a in the wheel hub 32 along a laterally outer side with respect to the vehicle, and an inner ring 33b which is fitted around an outer diameter surface of the hollow section 32a of the wheel hub 32 along a laterally inner side with respect to the vehicle and has an outer surface formed with an inner-side track surface; two rows of balls 33c disposed on the outer-side track surface and the inner-side track surface of the inside member 33a; an outer member 33d having an inner circumferential surface formed with an outer-side track surface and an inner-side track surface opposed to the outer-side track surface and the inner-side track surface in the inside member 33a; a retainer 33e which keeps a distance between mutually adjacent balls 33c; and sealing members 33f, 33g which seal two axial ends of the wheel hub bearing 33.

The outer member 33d of the wheel hub bearing 33 is fixed to the housing 22b of the speed reducer section B with fastening bolts 71.

The outer member 33d of the wheel hub bearing 33 has a flange section 33h on its outer diameter portion, and a cylindrical section 33i on its side facing the speed reducer section B.

Next, as shown in FIG. 8A, the electric vehicle 11 which includes the in-wheel motor driving devices according to a second embodiment of the present invention has a terminal box 62 for the power supply wires that supply power to the motor section A, disposed on an outboard-side end, or on an outboard-side outer circumferential side surface, of the housing which supports the motor section A, whereby the axial dimension is reduced by the size of the terminal box 62 and the vehicle's inside space is increased accordingly.

Figure 8B:
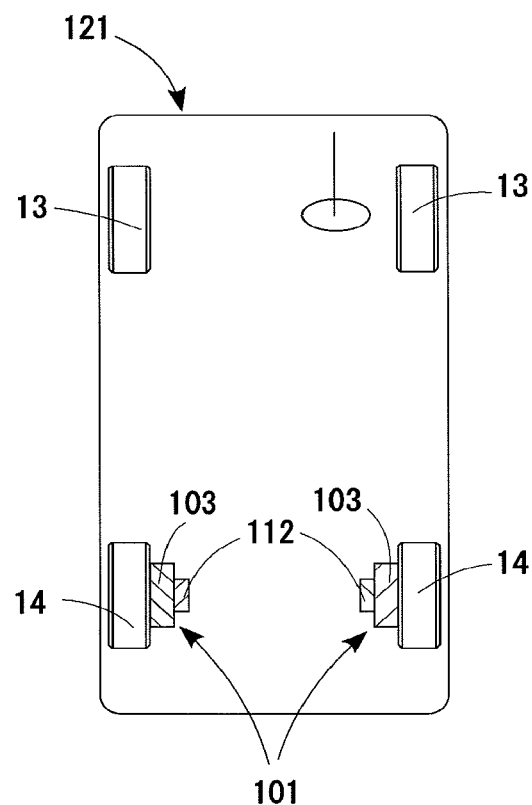
FIG. 8B is a simplified plan view of an electric vehicle which includes conventional in-wheel motor driving devices.

On the contrary, as shown in FIG. 8B, an electric vehicle 121 which includes conventional in-wheel motor driving devices 101 has its terminal box 112 for the power supply wires that supply power to the motor section 103, disposed on an inboard-side end surface of the housing which supports the motor section 103. Thus, the axial dimension is longer than in FIG. 8A by the size of the terminal box 112 and the vehicle's inside space is decreased accordingly.

The suspension system 12b includes suspension arms extending in the left-right direction and supporting the rear wheels 14, and struts each having a coil spring section and a shock absorber, thereby absorbing vibrations coming through the rear wheels 14 from the ground and reducing vibration of the chassis 12. Further, a stabilizer which reduces tilting of the vehicle body during a turning operation for example, is provided at each of the left and right connections of the suspension arms. Preferably, the suspension system 12b should be designed as an independent suspension system which is capable of allowing the left and the right wheels to move in vertical direction independently from each other for improved ground following capability and efficient transmission of driving force to the road surface even if the road surface has some irregularities.

In the in-wheel motor driving device according to the second embodiment, the motor section A, the speed reducer section B and the wheel hub bearing section C are arranged in the same configuration as in the in-wheel motor driving device according to the first embodiment, differing however in the location of the terminal box 62 for the power supply wires 61 that supply power to the motor section A.

Figure 12:
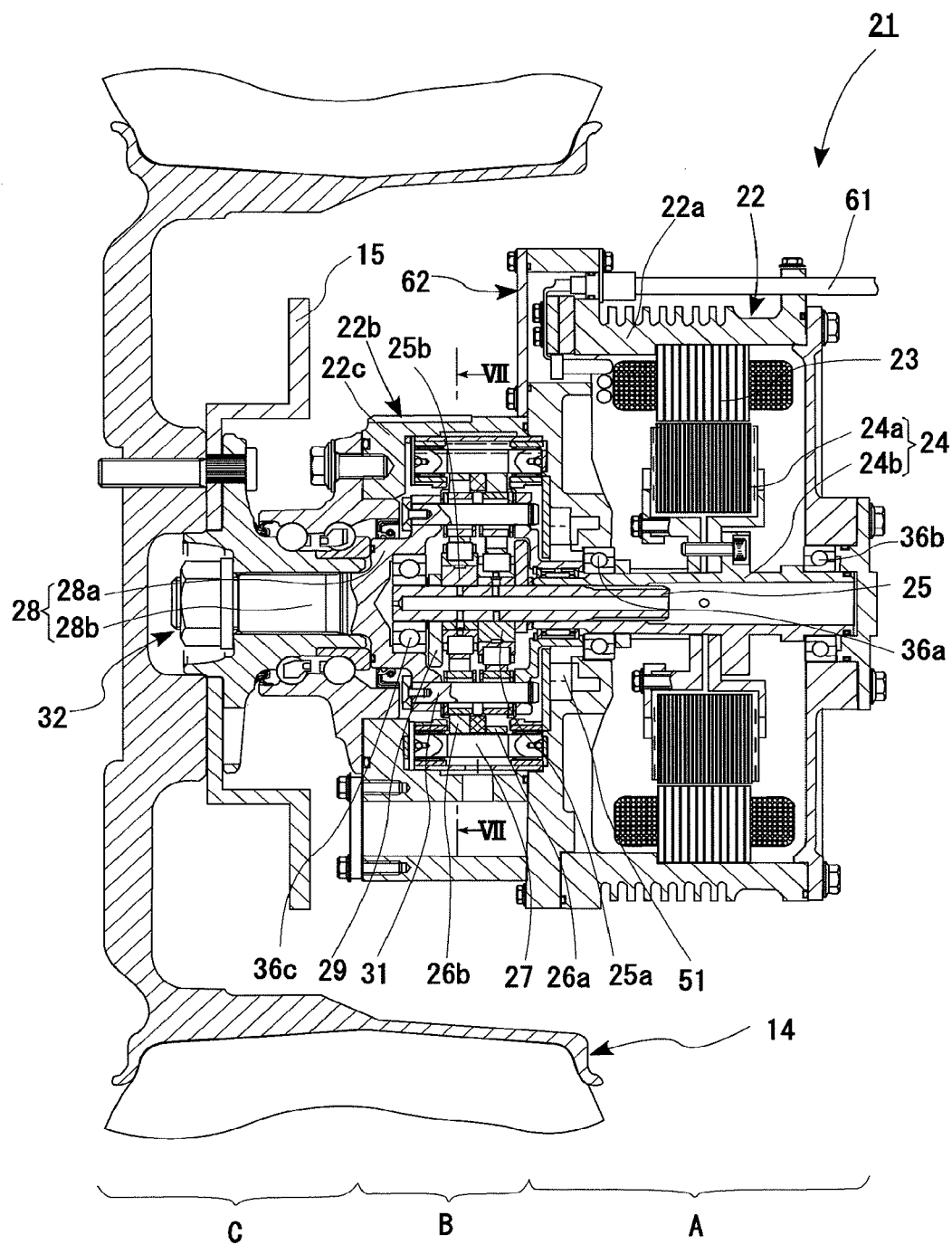
FIG. 12 is a simplified sectional view of an in-wheel motor driving device according to another embodiment of the present invention.
Figure 13:
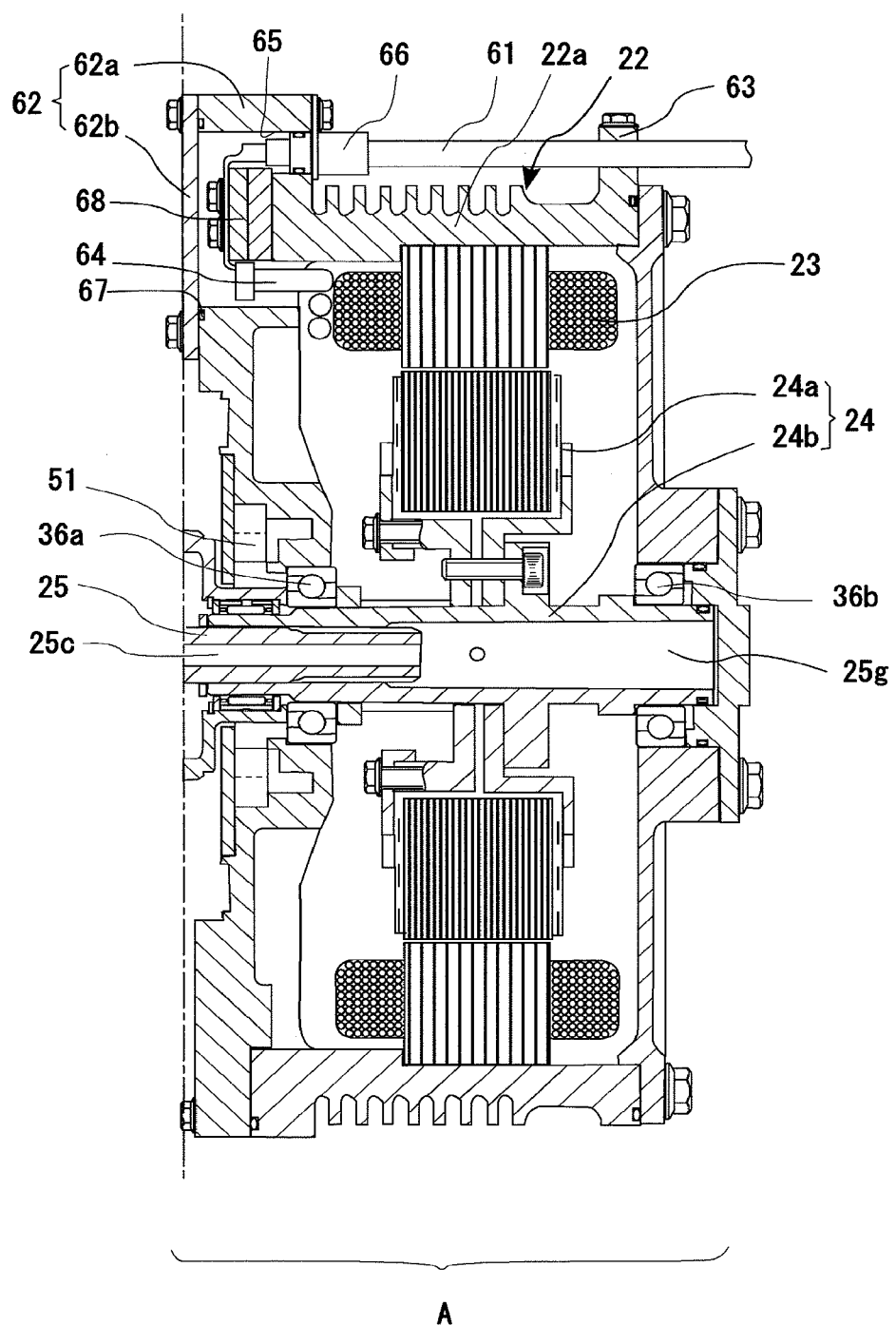
FIG. 13 is an enlarged view of a motor section in FIG. 12.

In the embodiment shown in FIG. 12 and FIG. 13, the terminal box 62 for the power supply wires 61 is disposed on the outboard-side end surface of the housing 22a which supports the motor section A whereas the power supply wires 61 routed out of the terminal box 62 to the inboard side is anchored by a cable holder 63, which is provided on the housing 22a that supports the motor section A.

The terminal box 61 includes a box main body 62a opening to the outboard side and formed integrally with the housing 22a which supports the motor section A; and a separate lid member 62b which closes the opening of the box main body 62a.

A wire 64, which is routed out of the stator 23 of the motor section A, is connected with the power supply wires 61 inside the terminal box 62.

The power supply wires 61 are constituted by a conductor wire and an elastic member which covers the conductor wire, has an end connected to a coil of the stator 23 and another end connected to the power source via an inverter, for application of a voltage of a predetermined frequency to the stator 23 in order to rotate the motor section A.

The terminal box 62 is formed with a communication hole 65 on the inboard side of an outer circumferential surface of the housing of the motor section A. The power supply wires 61 are routed out through this communication hole 65 and are supported straightly on the outer circumferential surface of the housing of the motor section A by the holder 63 which is provided on the inboard side of the outer circumferential surface of the housing 22a of the motor section A.

The holder 63 which holds the power supply wires 61 is formed integrally with the outer circumferential surface of the housing 22a of the motor section A.

The communication hole 65, through which the power supply wires 61 are routed out of the terminal box 62, is fitted with a sleeve-like sealing member 66 to prevent lubrication oil from leaking out of the terminal box 62.

Also, a sealing member 67 such as an O ring is provided between the box main body 62a of the terminal box 62 and the lid member 62b so as to prevent lubrication oil from leaking outside.

An insulation member 68 is attached to an area of connection between the wire 64 from the stator 23 of the motor section A and the power supply wires 61, in the housing 22a of the terminal box 62 of the motor section A.

Figure 14:
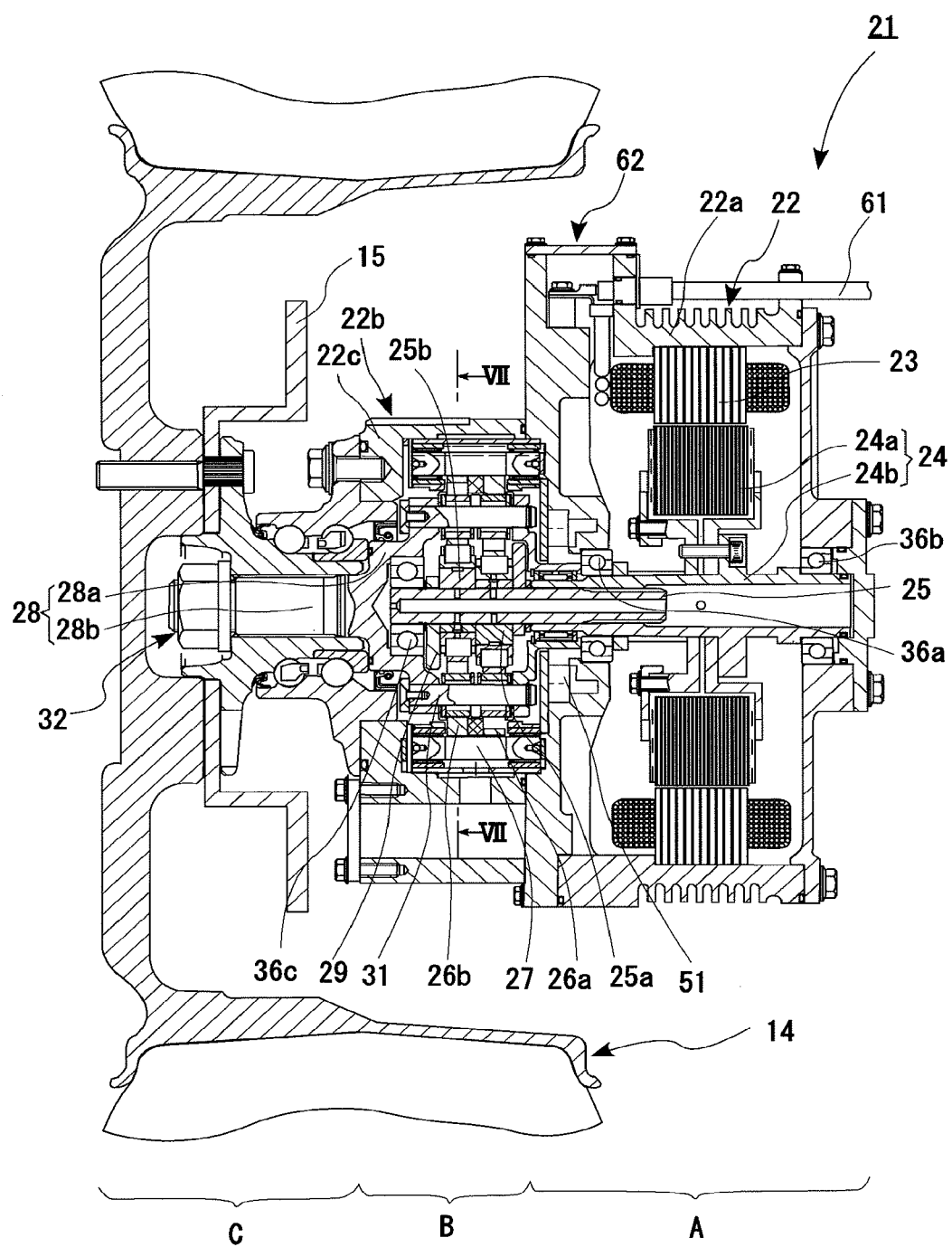
FIG. 14 is a simplified sectional view of an in-wheel motor driving device according to another embodiment of the present invention.
Figure 15:
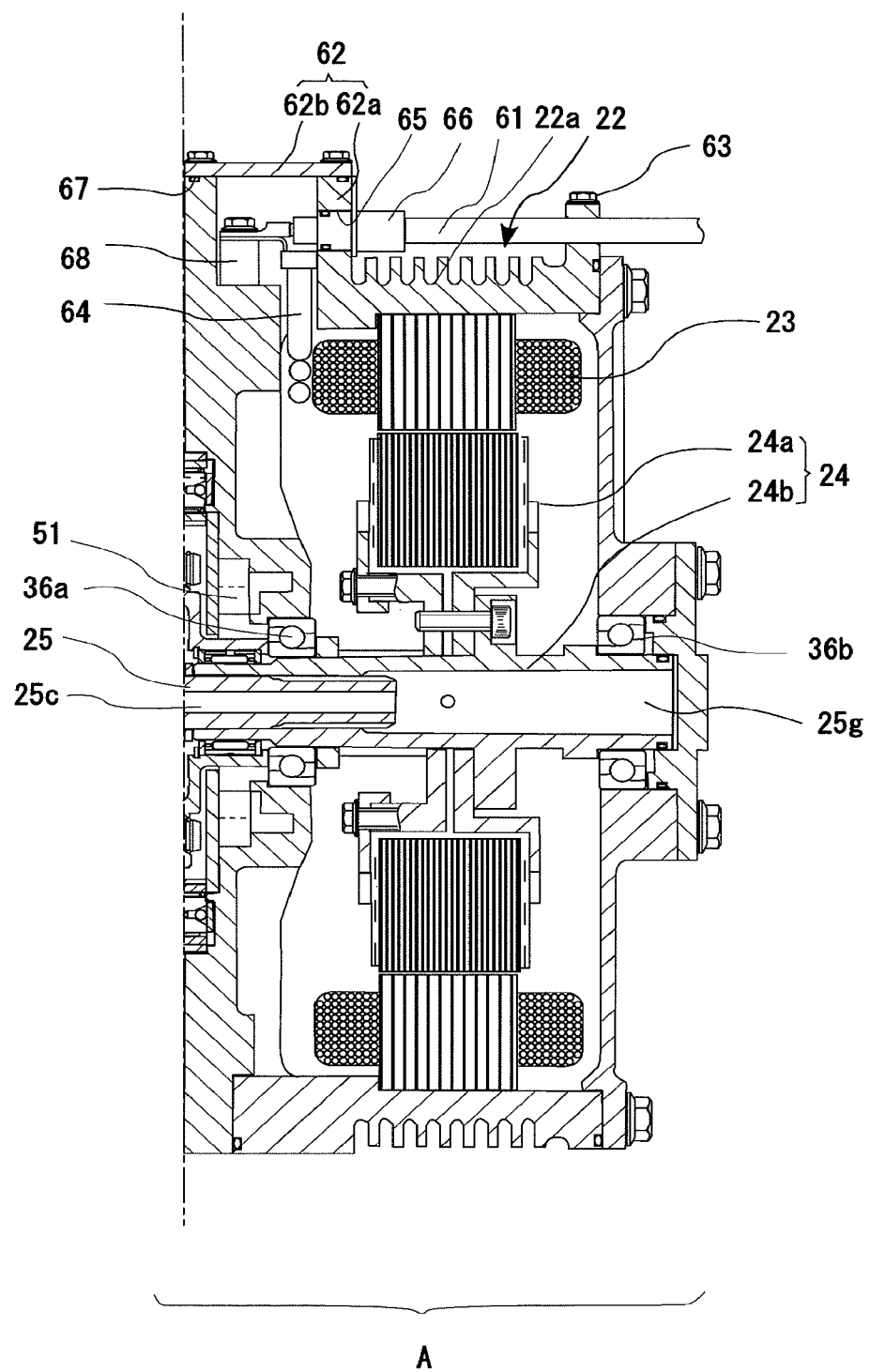
FIG. 15 is an enlarged view of a motor section in FIG. 14.
Figure 16:
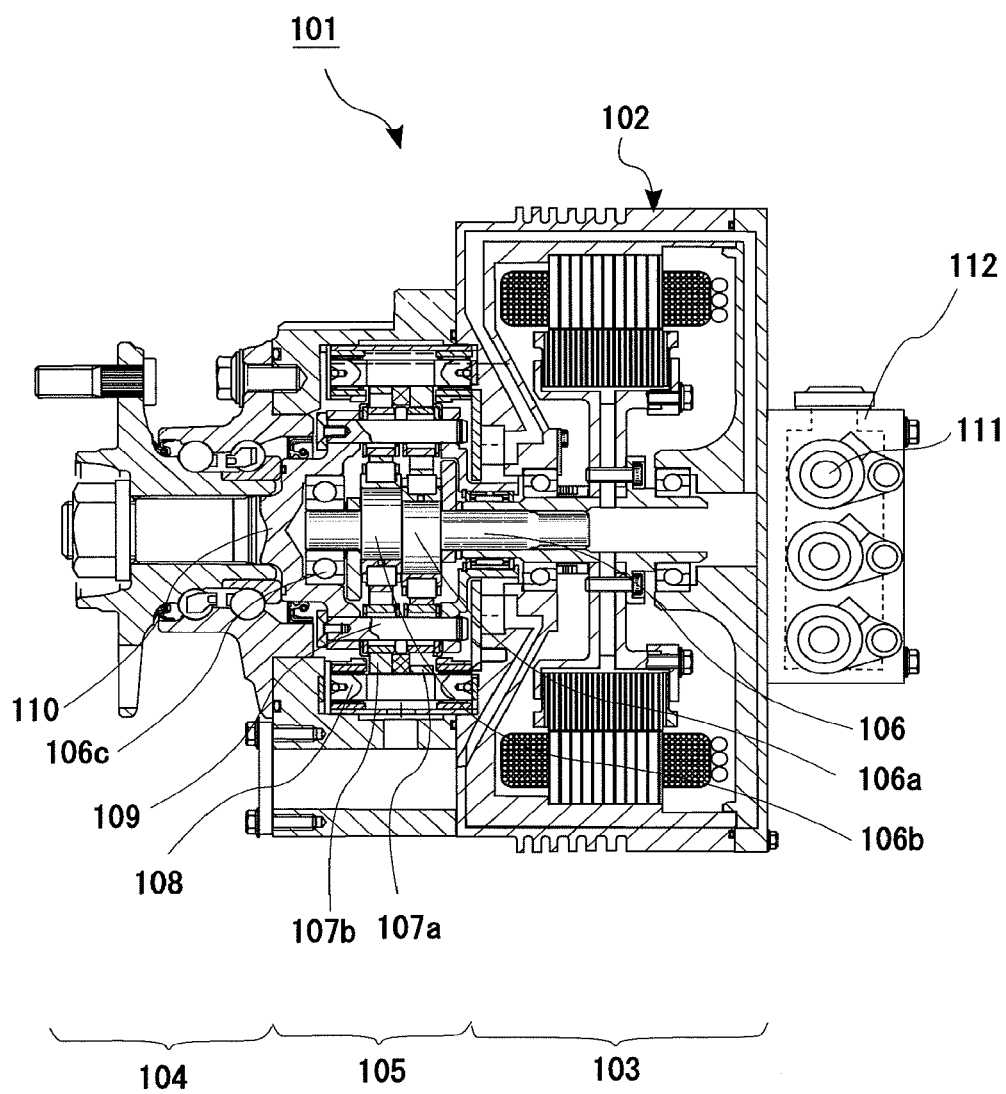
FIG. 16 is a simplified sectional view of a conventional in-wheel motor driving device.

FIG. 14 and FIG. 15 show another embodiment of the present invention, where the terminal box 62 for the power supply wires 61 is disposed on the outboard side of an outer circumferential surface of the housing 22a which supports the motor section A whereas the holder 63 which holds the power supply wires routed out of the terminal box 62 to the inboard side is provided on the housing 22a which supports the motor section A.

The terminal box 62 includes a box main body 62a opening to the outer circumferential surface and formed integrally with the housing 22a which supports the motor section A; and a separate lid member 62b which closes the opening of the box main body 62a.

In this embodiment shown in FIG. 14 and FIG. 15, the wire 64 from the stator 23 of the motor section A is routed radically toward the outer circumferential surface, into the terminal box 62, and then connected to the power supply wires 61 inside the terminal box 62.

Like the embodiment shown in FIG. 12 and FIG. 13, the terminal box 62 is formed with a communication hole 65 on the inboard side of an outer circumferential surface of the housing 22a of the motor section A. The power supply wires 61 are routed to pass through this communication hole 65 and are supported straightly on the outer circumferential surface of the housing 22a of the motor section A by a holder 63 which is provided on the inboard side of the outer circumferential surface of the housing 22a of the motor section A.

Again in this embodiment which is shown in FIG. 14 and FIG. 15, the communication hole 65 through which the power supply wires 61 are routed out of the terminal box 62, is fitted with a sleeve-like sealing member 66 to prevent lubrication oil from leaking out of the terminal box 62.

Also, a sealing member 67 such as an O ring is provided between the box main body 62a of the terminal box 62 and the lid member 62b so as to prevent lubrication oil from leaking outside.

Next, a working principle of the above-described in-wheel motor driving devices 21 will be described in detail.

In the motor section A, coils in the stator 23 is supplied with AC current for example to generate an electromagnetic force, which in turn rotates the rotor 24 which is provided by a permanent magnet or a magnetic member. If the frequency of the voltage which is supplied to the oil is increased, the rotor 24 rotates at an increased speed accordingly.

As the rotor 24 rotates, the motor-side rotation member 25 connected thereto rotates, which then causes the cycloid discs 26a, 26b to make their revolution around the rotation center of the motor-side rotation member 25. In this process, the outer pins 27 come into engagement with the curvy wave patterns of the cycloid discs 26a, 26b to cause the cycloid discs 26a, 26b to rotate in the opposite direction to the rotating direction of motor-side rotation member 25.

As the cycloid discs 26a, 26b make their rotational movement, the inner pins 31 which are inserted into the through-holes 30a make contact with inner wall surfaces of the through-holes 30a. In this movement, the revolving movements of the cycloid discs 26a, 26b are not transmitted to the inner pins 31 and only the rotational movements of the cycloid discs 26a, 26b are transmitted to the wheel hub bearing section C via the wheel-side rotation member 28.

In this process, the speed reducer section B reduces the speed of rotation of the motor-side rotation member 25, and then the movement is transmitted to the wheel-side rotation member 28. Therefore, the arrangement allows the use of a low-torque high-rotation motor section A since the arrangement can transmits necessary torque to the wheel 14 even with such a type of motor section.

It should be noted here that the speed reducer section B of the configuration described above has a speed reduction ratio which can be calculated as (ZA−ZB)/ZB, where ZA represents the number of the outer pins 27 whereas ZB represents the number of wave patterns in the cycloid discs 26a, 26b. FIG. 7 shows an embodiment with ZA=12 and ZB=11, which gives a very large speed reduction ratio of 1/11.

As understood, an in-wheel motor driving device 21 which is compact and has a high speed-reduction ratio can be achieved by utilizing a speed reducer section B which can provide a large speed reduction ratio without requiring a multi-stage configuration. Also, use of needle bearings 27a, 31a at places where the outer pins 27 and the inner pins 31 make their contact with their respective cycloid discs 26a, 26b reduces frictional resistance of these members with of the cycloid discs 26a, 26b, which improves transmission efficiency in the speed reducer section B.

The in-wheel motor driving devices 21 according to the above described embodiments have an advantage of decreased axial dimension. Therefore, an electric vehicle 11 which makes use thereof can have increased inside space.

In the embodiments described above, the rotary pump 51 is driven by using rotation of the wheel-side rotation member 28. However, the rotary pump 51 may be driven by using rotation of the motor-side rotation member 25. A potential problem in this case, however, is that rotating speed of the motor-side rotation member 25 is higher (eleven times in the above-described embodiment) than that of the wheel-side rotation member 28, so this may decrease service life of the rotary pump 51. Also, the wheel-side rotation member 28 is capable of producing a sufficient amount of output. From these view points, it is desirable that the rotary pump 51 is driven by using rotation of the wheel-side rotation member 28.

Also in the embodiments described above, the rotary pump is provided by a cycloid pump. However, the present invention is not limited to this, and the rotary pump may be provided by any type of rotary pump which can be driven by using rotation of the wheel-side rotation member 28.

Also, in the embodiment described above, the speed reducer section B has two cycloid discs 26a, 26b which have a 180-degree phase difference from each other. However, the number of the cycloid discs may be any. For example, three cycloid discs may be used at a 120-degree phase difference.

Further in the embodiment described above, the motion conversion mechanism is constituted by the inner pins 31 fixed to the wheel-side rotation member 28 and the through-holes 30a provided at the cycloid discs 26a, 26b. However, the present invention is not limited by this, and a motion conversion mechanism of whatsoever configuration may be employed as far as it can transmit the rotation of the speed reducer section B to the wheel hub 32. For example, the motion conversion mechanism may be constituted by the inner pins fixed to the cycloid discs and holes in the wheel-side rotation member.

It should be noted here that in the embodiment described above, working of components are described with their rotation in focus. Actually, however, a force which includes a torque is transmitted from the motor section A to the driving wheel. Therefore, the driving force provided as a result of speed reduction described above has a high torque.

Also, in the above description of the embodiment, electric power was supplied to the motor section A to drive the motor section A, and the driving force from the motor section A was transmitted to the driving wheel 14. There may be an additional, inverse arrangement for situations where the vehicle is decelerating or running down on a slope, to pick a force from the driving wheel 14 and convert it by the speed reducer section B into a high-speed low-torque rotation and transmit this rotation to the motor section A, so that the motor section A can serve as a power generator. Further, there may be an arrangement to store the power generated in this way in a battery for later use to drive the motor section A for example, or operate other electric components on board.

In the embodiment described above, the cycloid discs 26a, 26b were supported by cylindrical roller bearings. However, the present invention is not limited by this. For example, the bearing may be replaced by slide bearings, cylindrical roller bearings, tapered roller bearings, needle bearings, self-aligning roller bearings, deep groove roller bearings, angular contact ball bearings, four-point contact ball bearings, or any other types of bearing regardless of whether they are slide bearings or roller bearings, whether the bearings includes rollers or balls, or whether the bearings are single row type or double row type. The above applies to any other bearings which are disposed elsewhere in the device, so whatsoever types of bearing may be used.

It should be noted, however, that deep groove roller bearings have a higher allowable limit in terms of the number of rotations but have a lower load capacity as compared to cylindrical roller bearings. For this reason, a large deep groove roller bearing will have to be utilized in order to achieve a necessary load capacity. Therefore, cylindrical roller bearings will be more suitable as the roller bearing 41 in view of making the in-wheel motor driving devices 21 more compact.

In the above-described embodiments, the motor section A was provided by a radial gap motor. However, the present invention is not limited to this, and any suitable motor may be employed. For example, an axial gap motor which includes a stator fixed to a housing, and a rotor which is disposed inside the stator with an axial gap may be utilized.

Also, in each of the embodiments described above, the speed reducer section B in the in-wheel motor driving device 21 is implemented by a cycloid reduction gear system. However, the present invention is not limited to this, and any speed reducing mechanism may be employed. Examples include planetary gear speed reducing mechanism and parallel axis gear speed reducing mechanism.

Further, the electric vehicle 11 shown in FIG. 8A has the rear wheels 14 serving as driving wheels. However, the present invention is not limited to this, and the front wheels 13 may serve as driving wheels or the vehicle may be a four-wheel drive vehicle. It should be noted here that in the present description, the term "electric vehicle" means any type of vehicle which is driven by electricity. For example, therefore, hybrid cars and similar vehicles should also be included in this category.

Thus far, embodiments of the present invention have been described with reference to the drawings. However, the present invention is not limited to these illustrated embodiments. Any of these embodiments illustrated thus far may be modified or changed in many ways within the scope or within the equivalence of the present invention.

Reference Signs List
11 electric vehicle
12 chassis
12a wheel housing
12b suspension
13 front wheels
14 wheel
22a housing of motor section A
22b housing of speed reducer section B
61 power supply wire
62 terminal box
63 power supply wire holder
85 cable outlet

The invention claimed is:

1. An in-wheel motor driving device comprising:
a motor section which rotates a motor-side rotation member;
a speed reducer section which reduces and transmits rotation of the motor-side rotation member to a wheel-side rotation member; and
a wheel hub connected and fixed to the wheel-side rotation member,
wherein the motor section, the speed reducer section, and the wheel hub are disposed in series from an inboard side to an outboard side of a vehicle, and
wherein a terminal box for a power supply wire which supplies power to the motor section is disposed on an outboard-side end surface of a housing which supports the motor section, with a holder for anchoring the power supply wire routed out of the terminal box to an inboard side being provided on an inboard side of an outer circumference of the housing which supports the motor section.

2. The in-wheel motor driving device according to claim 1, wherein a wire from a stator of the motor section is routed in an outboard direction of the housing which supports the motor section.

3. The in-wheel motor driving device according to claim 1, wherein the holder for anchoring the power supply wire is formed integrally with the inboard side of the outer circumference of the housing which supports the motor section.

4. The in-wheel motor driving device according to claim 1, wherein the terminal box includes a box main body formed integrally with the housing which supports the motor section; and a lid member for closing an opening of the box main body.

5. The in-wheel motor driving device according to claim 4, wherein the lid member seals the box main body with a sealing member.

6. The in-wheel motor driving device according to claim 1, wherein the power supply wire is inserted into the terminal box via a sealing member.

7. The in-wheel motor driving device according to claim 1, wherein the speed reducer section is provided by a cycloid reduction gear system.

* * * * *